Oct. 14, 1952  C. A. NERACHER ET AL  2,613,774
VEHICLE BRAKE
Filed March 1, 1946  4 Sheets-Sheet 1
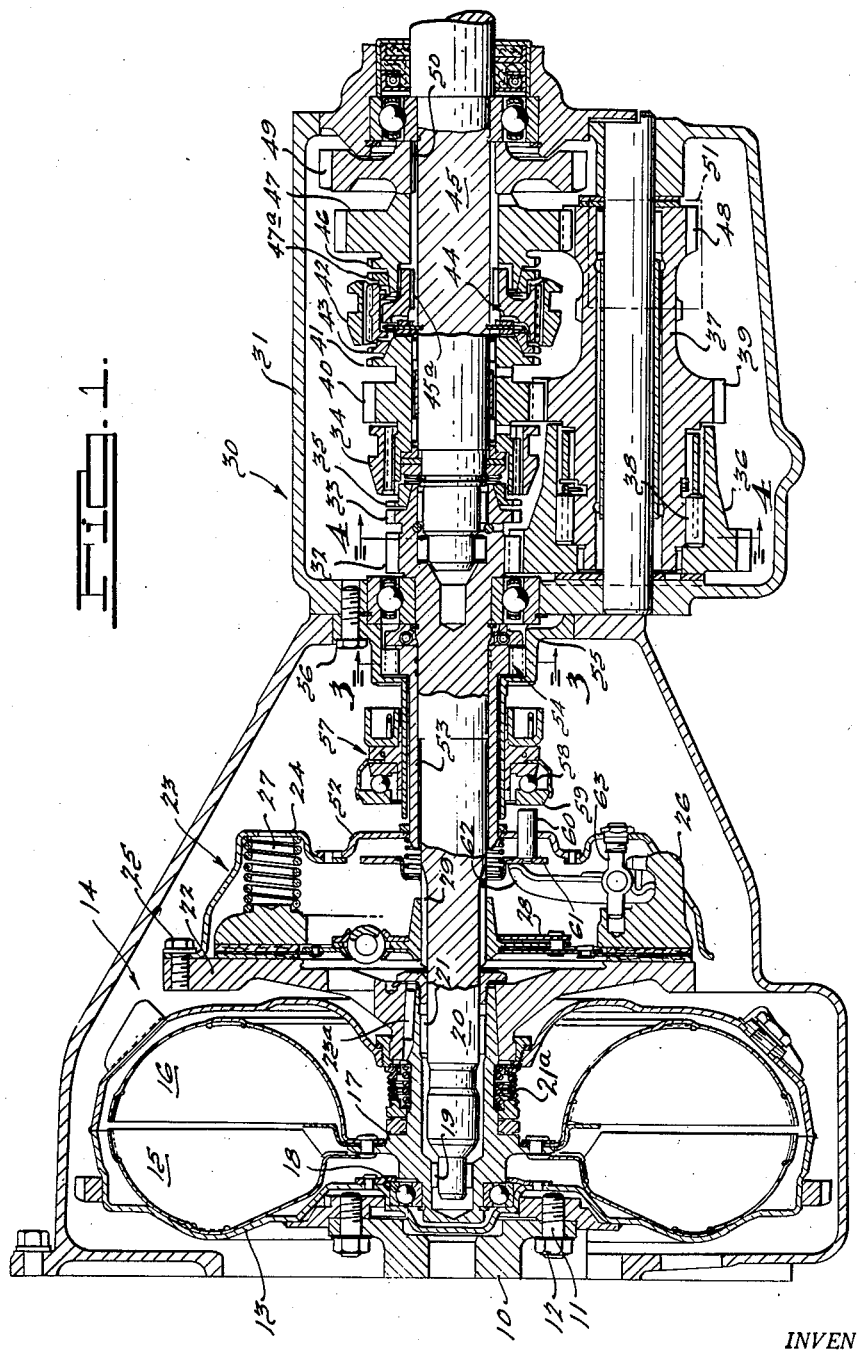
INVENTORS.
Carl A. Neracher,
William T. Dunn.
BY
Harness and Harris
ATTORNEYS.

Oct. 14, 1952 — C. A. NERACHER ET AL — 2,613,774

VEHICLE BRAKE

Filed March 1, 1946 — 4 Sheets-Sheet 2

INVENTORS.
Carl A. Neracher,
William T. Dunn.
BY
Harness and Harris
ATTORNEYS.

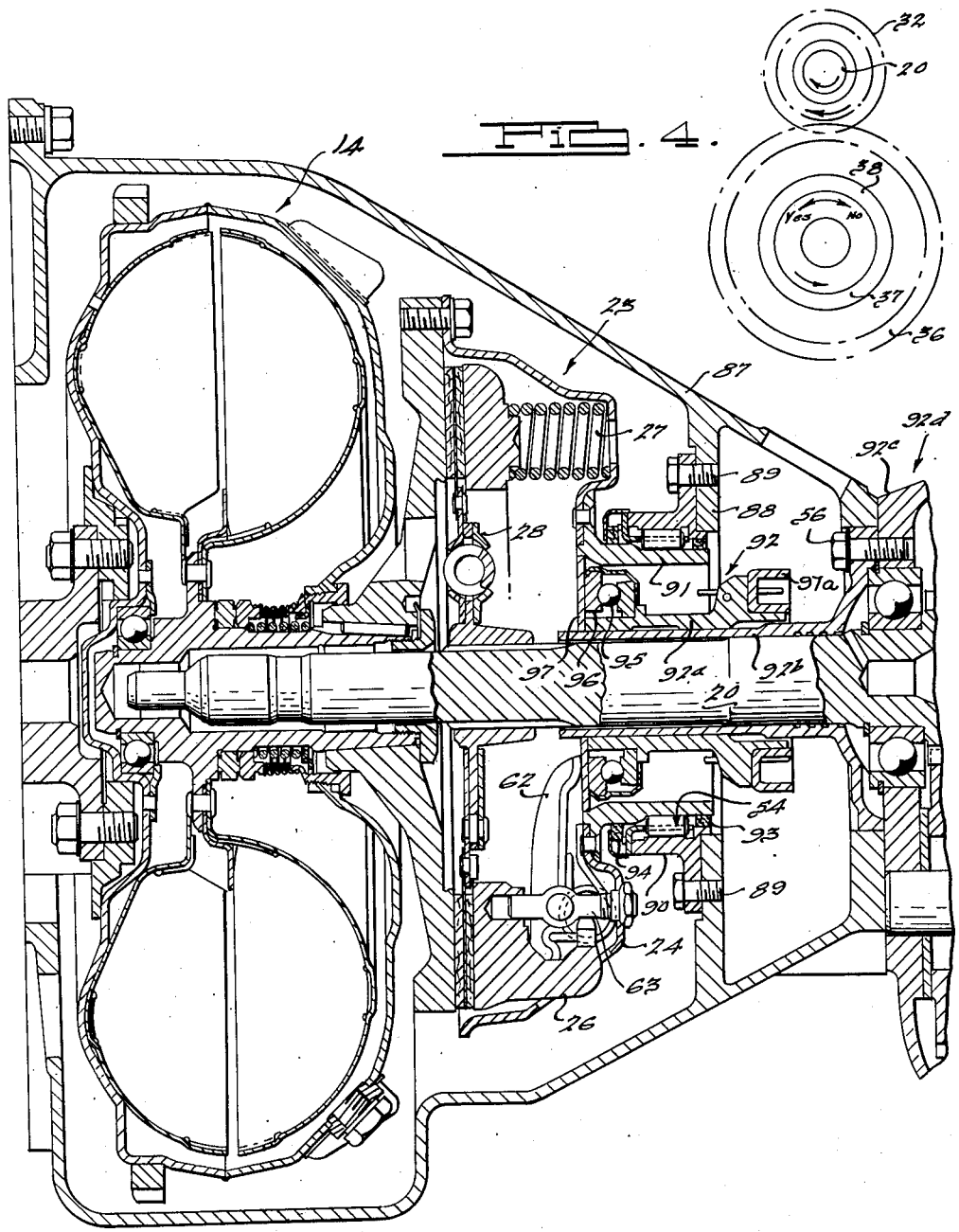

Patented Oct. 14, 1952

2,613,774

UNITED STATES PATENT OFFICE 2,613,774

VEHICLE BRAKE

Carl A. Neracher and William T. Dunn, Detroit, Mich., assignors to Chrysler Corporation, Highland Park, Mich., a corporation of Delaware Application March 1, 1946, Serial No. 651,253

24 Claims. (Cl. 192—4)

This application relates to the association of a braking means with the driving means of a motor vehicle.

It is usual practice to provide a motor vehicle with a special brake that may be applied when the vehicle is parked or when the vehicle is being maneuvered on inclines. If this special brake is defective as may frequently be the case, there may be no way of holding the vehicle in the above cases. It has been customary to park a vehicle in gear, but the practice is subject to the drawback that the vehicle may move if the incline on which it is parked is sufficient to cause the engine to turn over. Moreover, it is practically impossible to start the engine by a starter when the vehicle is in gear, and so it is impossible to hold the vehicle by its being in gear at a time when the engine is to be started. If the vehicle is provided with a slip-drive power-transmitting device such as a fluid coupling, or the like, located at some point between the driving wheels and the engine, the engine cannot be used to brake the car except to keep the vehicle below a speed at which the driven part of the fluid device will effectively attempt to drive the driving part. Accordingly, it becomes desirable to provide some supplementary braking means that will be effective under the conditions outlined above, and we have provided such a braking means.

An object of the present invention is to provide an improved braking means for a motor vehicle of a type that will prevent movement of the vehicle either forwards or backwards depending upon the drive selection made by the vehicle operator. The braking means may be associated with a conventional change-speed transmission in order to prevent relative forward movement or backward movement.

A further object is to associate a braking means that may take the form of a one-way brake with a main clutch of a motor vehicle so that the clutch may determine whether the braking means is to be operative.

Another object is to associate a one-way brake with a motor vehicle driven by an engine acting through a power transmitting device having a slip characteristic.

Still another object is to provide improvements in operating means for a clutch associated with a change-speed transmission as part of vehicle-propelling means and with a one-way brake acting with the clutch and transmission to hold the vehicle against movement as desired.

Other objects will appear from the disclosure.

Fig. 1 is a longitudinal section of a driving means comprising a fluid coupling, a clutch, and a change speed transmission, with which driving means the novel brake of the present invention is associated;

Fig. 4 is a diagrammatic view taken along the line 4—4 of Fig. 1;

Fig. 6 is a sectional view of the driving means to which a second modified form of brake is applied.

Figure 3:
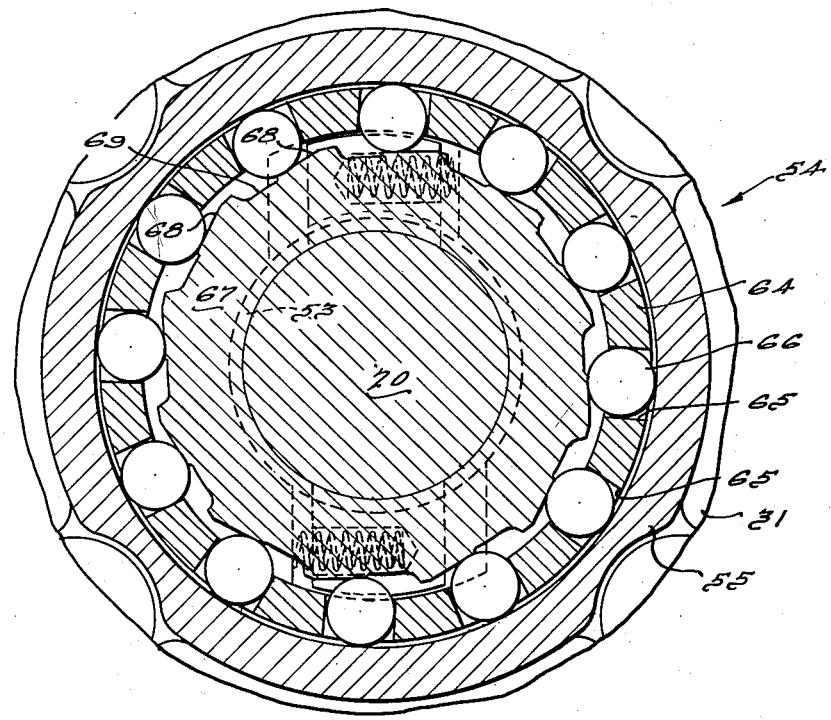
Fig. 3 is a sectional view taken on the line 3—3 of Fig. 1.

The reference character 10 designates a driving shaft, which may be an engine driven shaft such as a crankshaft. The driving shaft 10 is connected by screws 11 and nuts 12 to a casing 13 of a slip-drive power transmitting device such as the fluid coupling 14. The impeller 15 is secured in suitable manner to the casing 13. A runner 16, positioned in juxtaposed relation to the impeller 15 is secured to a hub part 17. The hub part 17 is journalled at one end exteriorly by means of a ball bearing 18 on the impeller casing 13 and interiorly by means of roller bearings 19 upon the reduced end of a driven shaft 20. The other end of the hub member is journalled by roller bearings 21 upon the driven shaft 20. A seal 21ª acts between one end of the casing 13 and the hub part 17 to keep fluid within the casing. A hub member 22, forming part of the driving side of a clutch 23 is keyed as indicated at 23ª to the hub part 17. The driving side of the clutch 23 also includes a cover 24 secured by screws 25 to the hub member 22, and a pressure ring 26 urged by springs 27 toward the hub member 22, thereby causing a disc member 28 constituting the driven side of the clutch 23 to be clamped between the pressure ring 26 and the hub member 22. The disc member 28 is keyed or splined as indicated at 29 to the driven shaft 20. The driven shaft constitutes the input shaft of a transmission 30 including a casing 31. One end of the shaft 20 projects into the transmission casing 31 and has formed thereon a gear 32 and a toothed section 33 engageable by a driving sleeve 34. In the position of parts shown in Fig. 1 a synchronizer ring 35 is positioned between the toothed section 33 and the sleeve 34.

The gear 32 continually meshes with a gear 36 which is mounted upon and drivingly connected to a compound gear 37 by means of a one-way clutch 38. The compound gear 37 has a gear section 39 continually meshing with a gear 40. One end of the gear 40 carries in slidable driving relation the sleeve 34, and the other end of the gear has a toothed section 41 engageable by a toothed sleeve 42, a synchronizer ring 43 being between the sleeve 42 and the toothed section 41. The sleeve 42 has a sliding driving connection with an intermediate driving member 44 keyed to an output shaft 45, as indicated at 45ª. The sleeve 42 is selectively engageable either with the toothed section 41 and the gear 40 or with a toothed section 46 upon a gear 47, there being a synchronizer ring 47ª between the toothed section 46 and the sleeve 42. The gear 47 continually meshes with a gear section 48 on the compound gear 37. A gear 49 is keyed as indicated at 50 to the output shaft 45. An idler gear 51, shown in dash-dot lines, continually meshes with the gear section 48 and is axially slidable into and out of engagement with the gear 49.

To the shell 24 of the clutch 23 is suitably secured an extension member 52, which extends radially inwardly into driving engagement with one end of a sleeve 53 mounted upon the driven shaft 20. The other end of the sleeve 53 is enlarged and is acted upon by a one-way brake 54, which also acts upon one end of a sleeve 55 secured by screws 56 to the transmission casing 31. The sleeve 55 surrounds the sleeve 53 and supports control means 57 for the clutch 23, which includes a ball bearing 58 and a ring 59. The ring 59 is engageable with one end of a plurality of pins 60 supported and extending through the extension part 52 of the clutch casing 24. The pins 60 project within the clutch casing 24 and are suitably secured as by riveting to a ring 61. The ring 61 engages the inner ends of a plurality of levers 62, which are fulcrumed upon members 63 suitably secured to the clutch casing or shell member 24. The outer ends of the levers 62 engage the pressure ring 26 of the clutch 23.

The one-way brake 54 is shown in detail in Fig. 3. As seen in this figure, the brake includes a ring 64 having a plurality of openings 65 in which are mounted a plurality of rollers 66. The enlarged end of the sleeve 53, which is designated by the reference character 67, is formed with a plurality of inclined faces 68 spaced from one another by channels or depressions 69. The inclined faces 68 are shown as engaging the rollers 66. If the sleeve 53 and its enlarged end 67 rotate in a clockwise direction as viewed in Fig. 3, the inclined faces 68 tend to move out of driving engagement with the rollers 66 and to allow the balls to move into a depression 69. Thus the sleeve 53 and its enlarged end 67 may rotate in a clockwise direction with respect to the sleeve 55 fixed to the transmission casing 31. If the sleeve 53 and its enlarged end 67 tend to move in a counterclockwise direction, as viewed in Fig. 3, the rollers 66 tend to move up the inclined faces 68 and thereby are tightly jammed between the inclined faces 68 and the inner surface of the fixed sleeve 55. Thus rotation of the sleeve 53 in a counterclockwise direction is prevented.

The operation of the entire device of Fig. 1 is as follows. Assume that the engine or other driving means tends to rotate the driving shaft 10 in a clockwise direction if viewed in the direction of the arrows 3—3, designating the location of the sectional view of Fig. 3 in Fig. 1. The casing 13 and the impeller 15 of the fluid coupling 14 will also rotate clockwise, and when they have attained a sufficient speed they will cause clockwise rotation of the runner 16 through the action of the fluid contained in the fluid coupling. This causes the hub part 17, and the hub member 22 keyed thereto and forming part of the driving side of the clutch 23 to rotate clockwise. If the clutch 23 is engaged as it is shown to be in Fig. 1, the disc member 28 will also rotate clockwise causing the driven shaft 20 to rotate in the same direction. The rotation of the driven shaft 20 which constitutes the input shaft of the transmission 30 is communicated in various ways to the output shaft 45 of the transmission through the gears contained in the transmission casing 31. Assume, for example, that the transmission gears are positioned as shown in Fig. 1, with the sleeve 34 so positioned as not to be in driving engagement with the toothed section 33 on the input shaft 20. Then drive is transmitted from the shaft 20 through the gear 32, the gear 36, the clutch 38, and the gear section 39 to the gear 40. If now the sleeve 42 is shifted to the left into engagement with the toothed section 41 on the gear 40, the gear 40 is directly connected to the output shaft 45. If a lower ratio of speed of output shaft 45 to speed of input shaft 20 is desired, the sleeve 42 is shifted to the right into engagement with the toothed section 46 on the gear 47. Then drive is transmitted from the input shaft 20 through the gear 32, the gear 36, the clutch 38, the gear section 48, the gear 47, and the sleeve 42 to the output shaft 45. The position of the sleeve 42 may be suitably manually controlled. The sleeve 34 may, for example, be automatically controlled from the speed of the input shaft 20 through suitable means, not shown. When the speed of the input shaft 20 reaches a certain amount, the sleeve 34 will shift to the left, engaging the toothed section 33 on the input shaft 20. Thus there is established a direct drive between the input shaft 20 and the gear 40. If under these conditions it is desired to connect the output shaft 45 directly to the input shaft 20, the sleeve 42 is shifted to the left so as to effect a direct connection between the gear 40 and the output shaft 45. If with the gear 40 directly connected to the input shaft 20 it is desired to have the output shaft 45 rotate at a lower speed than the input shaft 20, the sleeve 42 is shifted to the right to connect the gear 47 to the output shaft 45. At this time drive of the input shaft 20 is transmitted through the toothed section 33, the sleeve 34, the gear 40, the gear section 39, the gear section 48, the gear 47, and the sleeve 42 to the output shaft 45. The one-way clutch 38 will permit the compound gear 37 to rotate faster than the gear 36 as is required when there is a direct drive between the input shaft 20 and the gear 40. When the speed of the input shaft 20 falls below a certain value, the sleeve 34 will automatically shift to the right, causing a resumption of the driving conditions originally described. When it is desired to reverse the direction of the output shaft 45, the idler gear 51 is axially shifted to the right into engagement with the gear 49. Then drive is transmitted from the input shaft 20 through the gear 32, the gear 36, the clutch 38, the gear section 48, the idler gear 51, and the gear 49 to the output shaft 45. Conceivably, when the transmission is in reverse, the speed of the shaft 20 may become sufficiently high to cause the sleeve 34 to become engaged with the toothed section on the gear 20. Then drive will be transmitted from the input shaft 20 to the output shaft 45 through the gear 20, the sleeve 34, the gear 40, the gear section 39, the gear section 48, the idler gear 51, and the gear 49.

The manner of operation of the one-way clutch 38 is best seen in Fig. 4. In this figure the input shaft 20 and the gear 32 formed thereon are rotating in a clockwise direction and thus cause the gear 36 to rotate in a counterclockwise direction. The clutch 38 is so constructed that as indicated in the yes-no designation in Fig. 4, the compound gear 37 may rotate with respect to the gear 36 in a counterclockwise direction but may not rotate with respect to it in a clockwise direction. Thus the compound gear 37 may rotate faster than but not slower than the gear 36 in a counterclockwise direction. If the gear section 37 rotates in a clockwise direction, it will cause a clockwise rotation of the gear 36.

If drive is to be transmitted through the transmission 30, it is necessary that the input shaft 20 be drivingly connected with the driving shaft 19 through the clutch 23, and Fig. 1 shows the parts of the clutch 23 so positioned as to cause the input shaft to be so driven. When the input shaft 20 is not to be driven, the clutch 23 is disengaged by movement to the left of control means 57. This causes the ring 59 to move against the pins 60, which act through the ring 61 to shift the inner ends of the levers 62 to the left. This results in a rightward movement of the outer ends of the levers 62, which cause the pressure ring 26 to be shifted to the right against the action of the springs 27. This releases the disc member 28 from driving engagement with the hub member 22 of the clutch.

Let us now consider the desired function and purpose of the one-way brake 54 of Fig. 3. If the vehicle in which the driving means is mounted is parked on an incline such as to cause the vehicle to roll backwards, and it is impossible or undesirable to use a special brake to prevent such backward movement, the engine alone cannot be relied upon to prevent the backwards movement, for the runner 16 of the fluid coupling 14 may slip and rotate at low speeds with respect to the impeller 15. The one-way brake 54 will prevent such backwards movement in the following manner if the transmission 30 is set for any forward drive ratio. Backwards movement of the vehicle would cause the output shaft 45 of the transmission to rotate in a counterclockwise direction if viewed in the direction of the arrows 3—3 and 4—4 of Fig. 1. If now the sleeve 42 engages either the toothed section 46 of the gear 47 or the toothed section 41 of the gear 40, the counterclockwise rotation of the output shaft 45 tending to be produced by the backward movement of the vehicle would result in clockwise rotation of the compound gear 37. Since, as seen in Fig. 4, the one-way clutch 38 will prevent clockwise movement of the compound gear 37 with respect to the gear 36 there will be a tendency for clockwise movement of the gear 36 to be produced. This will result in an attempted counterclockwise movement of the gear 32 and the input shaft 20, which will be transmitted through the clutch 23, if engaged, to the sleeve 53. As was previously explained and is self-evident from Fig. 3, counterclockwise movement of the sleeve 53 cannot take place, because the inclined surfaces 68 move the rollers 66 outwardly against the fixed sleeve 55. If it is desired to permit the aforementioned backward movement of the vehicle, the clutch 23 may be disengaged and thereby the input shaft 20 is freed from the sleeve 53. It may be desirable to prevent backward movement of the vehicle at other times than when the vehicle is parked. For example, the vehicle may be temporarily stopped in traffic under conditions that would make it impossible to speed the engine sufficiently to cause the impeller 15 of the fluid coupling to rotate fast enough in a clockwise direction to prevent counterclockwise movement of the runner 16. It is only required that the clutch 23 be engaged and that the sleeve 42 be in one of its engaged forward drive positions.

If the sleeve 34 engages the toothed section 33 associated with gear 32 formed on input shaft, then backward movement of the vehicle would produce counterclockwise movement of the output shaft 45, which would produce counterclockwise movement of the input shaft 20, either directly with the sleeve 42 engaging the toothed section 41 on the gear 40, or indirectly with the sleeve 42 engaging the toothed section 46 on the gear 47. Such counterclockwise movement of the input shaft would with the clutch 23 engaged produce counterclockwise movement of the sleeve 53, which is prevented by the one-way brake 54, as previously described.

If the vehicle is on an incline such as would cause it to move forward, this may be prevented by setting the transmission 30 for reverse drive through engagement of the idler gear 51 with the gear 49 and effecting engagement of the clutch 23. Forward movement of the vehicle would result in clockwise rotation of the output shaft 45, which would be transmitted through the gears 49 and 51 as clockwise rotation to the compound gear 37. As previously described, the one-way clutch 38 will not permit clockwise rotation of the compound gear 37 without clockwise rotation of the gear 36. Clockwise rotation of the gear 36 would result in counterclockwise rotation of the gear 32 and the input shaft 20, and with the clutch 23 engaged counterclockwise rotation of the sleeve 53 would result. However, this is impossible because of the wedging action between the rollers 66 and the inclined surfaces 68 on the enlargement 67 formed on the end of the sleeve 53.

Figure 2:
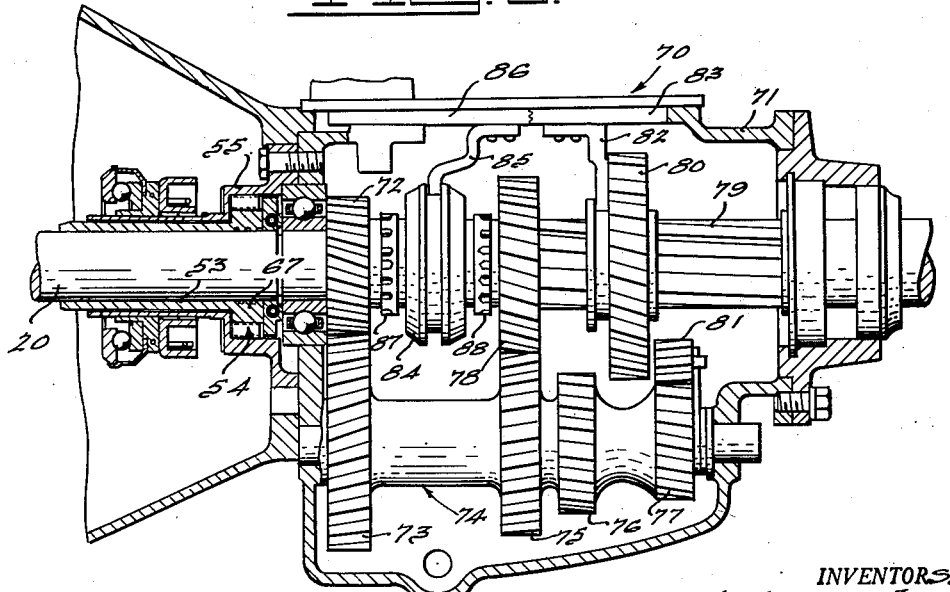
Fig. 2 is a longitudinal sectional view of a driving means including a modified form of transmission, to which driving means the novel brake of the present invention is applied.

Fig. 2 shows the one-way brake 54 in use with a different form of change speed transmission which is hereby designated with the reference character 70. A transmission casing 71 is provided in which is positioned a gear 72 formed on the end of the driven or input shaft 20. The gear 72 continuously meshes with a gear section 73 forming part of a compound gear 74 which also includes gear sections 75, 76, and 77. The gear section 75 continuously meshes with a gear 78 rotatably supported upon a transmission output shaft 79. A gear 80 is slidably and drivingly connected with the output shaft 79 so as to mesh either with the gear section 76 or with idler gear 81 continuously meshing with the gear section 77. The position of the gear 80 is controlled by a fork 82 attached to a rail 83. When the gear 80 engages the gear section 76, the transmission 70 is in first or low, drive being transmitted from the input shaft 20 through the gear 72, the gear section 73, the gear section 76, and the gear 80 to the output shaft 79. When the gear 80 meshes with the idler gear 81, the transmission is in reverse, the shaft 79 rotating in a counterclockwise direction when viewed from left to right if the input shaft 20 rotates in a clockwise direction. In this condition drive is transmitted from the input shaft 20 through the gear 72, the gear section 73, the gear section 77, the idler gear 81, and the gear 80 to the output shaft 79. Positioned between the gears 72 and 78 is a shifting member 84 controlled by a fork 85 attached to a rail 86. The shifting member 84 has at one end an internal clutching section (not shown) formed to mesh with a mating clutching section 87 formed on the end of the input shaft 20. An internal clutching section, not shown, is formed on the other end of the shifting member 84 and is adapted to mesh with a mating clutching section 88 formed on the gear 78. The shifting member 84 has slidable driving engagement with the output shaft 79. When the shifting member 84 is moved to the right so that its internal clutch teeth engage the teeth on clutching section 88 formed on the gear 78, the transmission 70 is in second or intermediate, drive being transmitted from the input shaft 20 through the gear 72, the gear section 73, the gear section 75, the gear 78, and the shifting member 84 to the output shaft 79. When the member 84 is moved to the left, its internal clutch teeth engage the teeth on the clutching section 87 formed on the end of the input shaft 20, and the transmission is in third or direct or high, the input shaft being directly connected to the output shaft 79 through the member 84 and thereby causing the output shaft 79 to rotate at the same speed as the input shaft 20.

The one-way brake 54 functions with the transmission 70 of Fig. 2 in the manner described for Fig. 1. If backward movement of the vehicle is to be prevented the clutch 23 connecting the fluid coupling and the input shaft 20 is engaged, and the member 84 is shifted to the right or to the left so as to be engaged either with gear 78 or with input shaft 20, or the gear 80 is shifted to the left into engagement with the gear section 76 to condition the transmission 70 for forward drive. Thus counterclockwise rotation of the output shaft 79 tending to be produced by backward movement of the vehicle would cause counterclockwise movement of the input shaft 20 and of the sleeve 53. However, the one-way brake 54 prevents counterclockwise movement of the sleeve 53 and thereby prevents counterclockwise movement of the input shaft 20 and the output shaft 79 and backward movement of the vehicle. When backward movement of the vehicle is to be allowed the clutch is disengaged, and the input shaft 20 may rotate in a counterclockwise direction independently of the sleeve 53. If forward movement of the vehicle is to be prevented the gear 80 is shifted into engagement with the idler gear 81 to condition the transmission 70 for reverse drive. Forward movement of the vehicle would result in clockwise movement of the output shaft 79 which would be transmitted through the gear 80, the idler gear 81, the gear section 77, the gear section 73, and the gear 72 as counterclockwise rotation of the input shaft 20. Since engagement of the clutch 23 prevents relative rotation between the input shaft 20 and the sleeve 53, the one-way brake 54 will prevent counterclockwise rotation of the input shaft 20. If the vehicle is to be allowed to move forwardly, the clutch 23 is disengaged.

Figure 5:
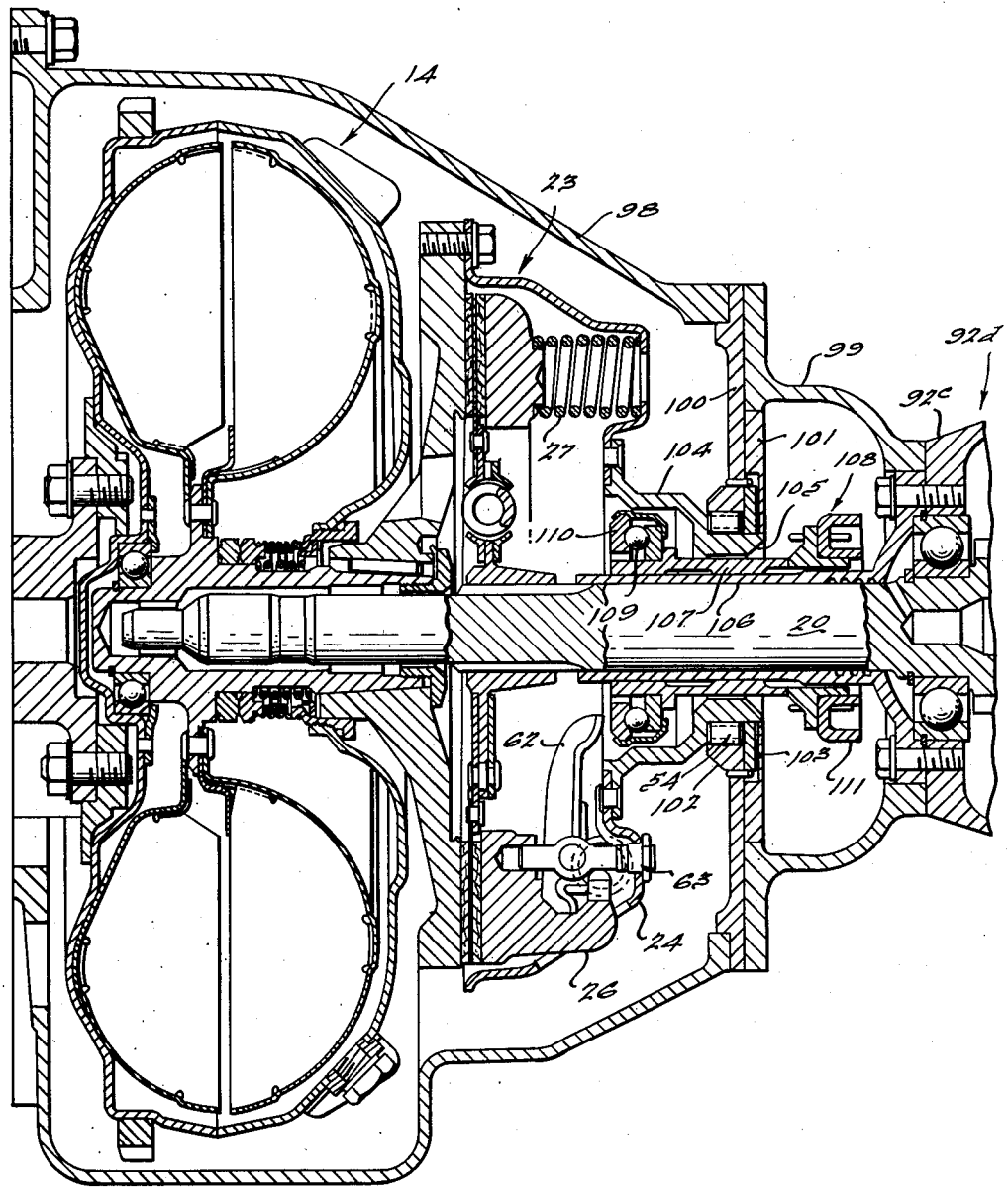
Fig. 5 is a sectional view of a driving means to which a modified form of brake is applied.

In the modification of Fig. 5 the one-way brake 54 is located in a somewhat different position. A housing 87 for the fluid coupling 14 and the clutch 23 is provided with an inwardly directed flange 88 to which is secured by a plurality of screws 89 a flange ring 90, which acts against the one-way brake 54 in the manner of a fixed member similar to the fixed sleeve 55 in Figs. 1 and 2. The one-way brake also acts against a sleeve 91 which does not directly surround the input shaft 20 in the manner of the sleeve 53 in Figs. 1 and 2 but is spaced outwardly therefrom so as to provide room for a control means 92 for the clutch 23. Seals 93 and 94 are provided to retain lubricant in the one-way brake 54 of Fig. 5. The control means 92 includes a sleeve 92$^a$, ball bearings 95, and a ring 96 engaging the ball bearings 95 and engaging another ring 97 all at the left end of the sleeve 92$^a$, and at the right end thereof a part 97$^a$, adapted to be suitably engaged by a lever or other control mechanism, not shown. The ring 97 engages the inner end of the plurality of levers 62 which in the manner of Fig. 1 are fulcrumed on members 63 secured to clutch shell part 24. The outer ends of the levers 62 act against the pressure ring 26 of the clutch 23. Sleeve 92$^a$ directly surrounds a fixed sleeve 92$^b$ secured by screws 56 to a casing 92$^c$ of a transmission 92$^d$. The one-way brake 54 of Fig. 5 functions in the same manner as that of Fig. 1 in that it prevents the sleeve 91 from rotating in a counterclockwise direction when viewed in the section looking from left to right. When the clutch 23 is engaged, the connection of the sleeve 91 with the input shaft 20 through the clutch 23 assures that the input shaft 20 cannot rotate in a counterclockwise direction. If now the transmission 92$^d$ is set for any forward speed, the output shaft thereof also may not rotate in a counterclockwise direction, and this means that the vehicle may not roll backwards. If the transmission is set for reverse, the output shaft may not rotate in a clockwise direction, and thus the vehicle is prevented from rolling forwards. Disengagement of the clutch 23 will permit the vehicle to roll forwards or backwards.

The construction of Fig. 6 is somewhat similar to that of Fig. 5. A housing 98 for the fluid coupling 14 and the clutch 23 is secured to the transmission housing 92$^c$ by means of a housing extension 99. Parts 100 and 101 are suitably secured to the housing 98 and the housing extension 99 and fixedly carry an outer ring 102 an end member 103 for the one-way brake 54. The one-way brake 54 acts between the fixed ring 102 and a sleeve 104 secured to the clutch shell member 24 forming part of the driving side of the clutch 23. The one-way brake 54 acts against a portion 105 of relatively small radius of the sleeve 104 which does not directly surround the input shaft 20 but is spaced therefrom only by a sleeve 106 secured to the transmission casing 92$^c$ and by a sleeve 107 forming part of control means 108 for the clutch 23. The control means 108 includes also a ball bearing 109 and a ring 110 mounted at the left end of the sleeve 107 and a part 111 at the right end of the sleeve 107. The part 111 is adapted to be suitably engaged by a lever or other control mechanism, not shown, through which the sleeve 107 may be shifted to the left, causing the ring 110 to engage and to move to the left the inner ends of levers 62 fulcrumed upon members 63. Thus rightward movement of the outer ends of the levers 62 is produced, causing rightward movement of the pressure ring 26 against springs 27 and disengagement of clutch 23. The one-way brake of Fig. 6 functions in the same manner as those of Figs. 1 and 5 in that it prevents the sleeve 104 from rotating in a counterclockwise direction when viewed in a section looking from left to right. When the clutch 23 is engaged, the connection of the sleeve 104 with the input shaft 20 through the clutch 23 assures that the input shaft 20 will not rotate in a counterclockwise direction. If now the transmission 92$^d$ is set for any forward speed, the output shaft thereof may not rotate in a counterclockwise direction, and this means that the vehicle may not roll backwards. If the transmission is set for reverse, the output shaft may not rotate in a clockwise direction, and thus the vehicle is prevented from rolling forwards. Disengagement of the clutch will permit the vehicle to roll forwards or backwards.

The transmission 92$^d$ used with the modification of Fig. 5 or with that of Fig. 6 may be like the transmission 30 of Fig. 1 or the transmission 70 of Fig. 2.

The constructions of Figs. 5 and 6 have the advantage that the clutch control means does not extend through the connection between the clutch casing and the rotatable sleeve against which the one-way brake 54 acts. The construction of Fig. 1 has the advantage that the one-way brake 54 is kept at as small a radius as possible, since the rotatable shaft 53 against which the one-way brake acts directly surrounds the input shaft 20.

We claim:

1. The combination with an engine, a change-speed transmission having an input shaft and an output shaft and settable in a first driving arrangement involving rotation of the shafts in the same direction and in a second arrangement involving rotation of the shafts in opposite directions, and a clutch having a driving side adapted to be drivingly connected with the engine and a driven side adapted to be drivingly connected with the input shaft of the transmission; of a one-way brake associated with the driving side of the clutch for preventing during engagement of the clutch the output shaft from rotating the input shaft in a direction opposite to that produced by normal engine operation with the transmission either in the first drive-transmitting arrangement or in the second drive-transmitting arrangement.

2. The combination with a driving means for a vehicle comprising an engine, a change-speed transmission having an input shaft and an output shaft and being settable in a first drive-transmitting arrangement involving a forward movement of the vehicle for a certain direction of rotation of the input shaft produced by normal engine operation and in a second drive-transmitting arrangement involving a rearward movement of the vehicle for the said certain direction of rotation of the input shaft, and a clutch having a driving side adapted to be drivingly connected with the engine and a driven side drivingly connected with the input shaft of the transmission; of a one-way brake associated with the driving side of the clutch so as to prevent rotation of the input shaft of the transmission opposite to the said certain direction during engagement of the clutch thereby preventing rearward movement of the vehicle with the transmission set for the first drive-transmitting arrangement and forward movement of the vehicle with the transmission set for the second drive-transmitting arrangement.

3. The combination with a change-speed transmission having an input shaft and an output shaft and a clutch having a driving side and a driven side drivingly connected with the input shaft of the transmission; of a one-way brake associated with the driving side of the clutch for preventing during engagement of the clutch rotation of the input shaft in a certain direction and therewith rotation of the output shaft in one direction or the other depending upon the drive-transmitting arrangement of the transmission.

4. The combination with a driving means for a vehicle comprising an engine, a change-speed transmission having an input shaft and an output shaft and being settable in a first drive-transmitting arrangement involving a forward movement of the vehicle for a certain direction of rotation of the input shaft produced by normal engine operation and in a second drive-transmitting arrangement involving a rearward movement of the vehicle for the said certain direction of rotation of the input shaft, a clutch having a driving side and a driven side drivingly connected with the input shaft of the transmission, and a fluid power-transmitting device connecting the engine and the driving side of the clutch; of a one-way brake associated with the driving side of the clutch so as to prevent rotation of the input shaft of the transmission opposite to the said certain direction during engagement of the clutch for preventing rearward movement of the vehicle with the transmission set for the first drive-transmitting arrangement and forward movement of the vehicle with the transmission set for the second drive-transmitting arrangement.

5. The combination with an engine, a change-speed transmission comprising a casing, an input shaft projecting from the casing, an output shaft, and gearing connecting the input shaft and output shaft for providing a first drive-transmitting arrangement involving rotation of the output shaft in one direction for a given direction of rotation of the input shaft and a second drive-transmitting arrangement involving rotation of the output shaft in the opposite direction for the said given direction of rotation of the input shaft, a clutch comprising a driving side and a driven side drivingly connected with the input shaft, and a fluid power-transmitting device connecting the engine and the driving side of the clutch; of a sleeve surrounding a portion of the input shaft outside of the transmission casing and drivingly connected wiht the driving side of the clutch, and a one-way brake acting between the sleeve and the transmission casing for preventing rotation of the input shaft opposite to the given direction of rotation during engagement of the clutch.

6. The combination with an engine, a change-speed transmission comprising a casing, an input shaft projecting from the casing, an output shaft, and gearing connecting the input shaft and output shaft for providing a first drive-transmitting arrangement involving rotation of the output shaft in one direction for a given direction of rotation of the input shaft and a second drive-transmitting arrangement involving rotation of the output shaft in the opposite direction for the said given direction of rotation of the input shaft, a clutch comprising a driving side and a driven side drivingly connected with the input shaft, and a fluid power-transmitting device connecting the engine and the driving side of the clutch; of a first sleeve surrounding a portion of the input shaft outside of the transmission casing and drivingly connected with the driving side of the clutch, a second sleeve surrounding the first sleeve and being attached to the transmission casing, means adjustably mounted on the second sleeve for shifting the driven side of the clutch with respect to the driving side thereof for producing engagement and disengagement of the clutch, and a one-way brake acting between the sleeves adjacent the transmission casing for preventing during engagement of the clutch rotation of the input shaft in a direction opposed to the said given direction.

7. The combination with driving means for a vehicle comprising an engine, a change-speed transmission comprising a casing, an input shaft projecting from the casing, an output shaft, and gearing interconnecting the shafts for providing a first drive-transmitting arrangement involving for a given direction of rotation of the input shaft rotation of the output shaft in one direction and forward movement of the vehicle and a second drive-transmitting arrangement involving for the said given direction of rotation of the input shaft rotation of the output shaft in a direction opposite to the said one direction and rearward movement of the vehicle, a clutch comprising a driving side and a driven side drivingly connected with the input shaft, and a fluid power-transmitting device connecting the engine and the driving side of the clutch; of a sleeve surrounding a portion of the input shaft outside of the transmission casing and drivingly connected with the driving side of the clutch, and a one-way brake acting between the sleeve and the transmission casing so as to prevent rotation of the input shaft opposite to the given direction of rotation during engagement of the clutch, whereby when the transmission is in the first drive-transmitting arrangement the vehicle is prevented from moving rearwards, and when the transmission is in the second drive-transmitting arrangement the vehicle is prevented from moving forwards.

8. The combination with driving means for a vehicle comprising an engine, a change-speed transmission comprising a casing, an input shaft projecting from the casing, an output shaft, and gearing interconnecting the shafts for providing a first drive-transmitting arrangement involving for a given direction of rotation of the input shaft rotation of the output shaft in one direction and forward movement of the vehicle and a second drive-transmitting arrangement involving for the said given direction of rotation of the input shaft rotation of the output shaft in a direction opposite to the said one direction and rearward movement of the vehicle, a clutch comprising a driving side, a driven side drivingly connected with the input shaft, and means for adjusting the driving and driven sides of the clutch with respect to one another to produce engagement and disengagement of the clutch, and a fluid power-transmitting device drivingly connecting the engine and the driving side of the clutch; of a first sleeve surrounding a portion of the input shaft outside of the transmission casing and drivingly connected with the driving side of the clutch, a second sleeve surrounding the first sleeve outside of the casing and attached to the transmission casing, means supporting the adjusting means for the clutch on the second sleeve, and a one-way brake acting between the sleeves adjacent the transmission casing so as to prevent rotation of the input shaft opposite to the said given direction of rotation during engagement of the clutch whereby when the transmission is in the first drive-transmitting arrangement the vehicle is prevented from moving rearwards and when the transmission is in the second drive-transmitting arrangement the vehicle is prevented from moving forwards.

9. The combination with driving means for a vehicle comprising an engine, a change-speed transmission comprising a casing, an input shaft projecting from the casing, an output shaft, and gearing interconnecting the shafts for providing a first drive-transmitting arrangment involving for a given direction of rotation of the input shaft rotation of the output shaft in one direction and forward movement of the vehicle and a second drive-transmitting arrangement involving for the said given direction of rotation of the input shaft rotation of the output shaft in a direction opposite to the said one direction and rearward movement of the vehicle, a clutch comprising a driving side adapted to be drivingly connected with the engine and a driven side drivingly connected with the input shaft; of a sleeve surrounding a portion of the input shaft outside of the transmission casing and drivingly connected with the driving side of the clutch, and a one-way brake acting between the sleeve and the transmission casing so as to prevent rotation of the input shaft opposite to the given direction of rotation during engagement of the clutch, whereby when the transmission is in the first drive-transmitting arrangement the vehicle is prevented from moving rearwards, and when the transmission is in the second drive-transmitting arrangement the vehicle is prevented from moving forwards.

10. The combination with driving means for a vehicle comprising an engine, a change-speed transmission comprising a casing, an input shaft projecting from the casing, an output shaft, and gearing interconnecting the shafts for providing a first drive-transmitting arrangement involving for a given direction of rotation of the input shaft rotation of the output shaft in one direction and forward movement of the vehicle and a second drive-transmitting arrangement involving for the said given direction of rotation of the input shaft rotation of the output shaft in a direction opposite to the said one direction and rearward movement of the vehicle, a clutch comprising a driving side adapted to be drivingly connected with the engine, a driven side drivingly connected with the input shaft, and means for adjusting the driving and driven sides of the clutch with respect to one another to effect engagement and disengagement of the clutch; of a first sleeve surrounding a portion of the input shaft outside of the transmission casing and drivingly connected with the driving side of the clutch, a second sleeve surrounding the first sleeve outside of the casing and attached to the transmission casing, means supporting the adjusting means for the clutch on the second sleeve, and a one-way brake acting between the sleeves adjacent the transmission casing so as to prevent rotation of the input shaft opposite to the said given direction of rotation during engagement of the clutch whereby when the transmission is in the first drive-transmitting arrangement the vehicle is prevented from moving rearwards and when the transmission is in the second drive-transmitting arrangement the vehicle is prevented from moving forwards.

11. The combination with a change-speed transmission comprising a casing, an input shaft projecting from the casing, an output shaft, and gearing connecting the input shaft and output shaft for providing a first drive-transmitting arrangement involving rotation of the output shaft in one direction for a given direction of rotation of the input shaft and a second drive-transmitting arrangement involving rotation of the output shaft in the opposite direction for the said given direction of rotation of the input shaft, a clutch positioned completely exterior of the transmission casing and comprising a driving side and a driven side drivingly connected with the input shaft; of a sleeve surrounding a portion of the input shaft outside of the transmission casing and drivingly connected with the driving side of the clutch, and a one-way brake acting between the sleeve and the transmission casing for preventing rotation of the input shaft opposite to the given direction of rotation during engagement of the clutch.

12. The combination with a change-speed transmission comprising a casing, an input shaft projecting from the casing, an output shaft, and gearing connecting the input shaft and output shaft for providing a first drive-transmitting arrangement involving rotation of the output shaft in one direction for a given direction of rotation of the input shaft and a second drive-transmitting arrangement involving rotation of the output shaft in the opposite direction for the said given direction of rotation of the input shaft, a clutch positioned completely exterior of the transmission casing and comprising a driving side and a driven side drivingly connected with the input shaft; of a first sleeve surrounding a portion of the input shaft outside of the transmission casing and drivingly connected with the driving side of the clutch, a second sleeve surrounding the first sleeve and being attached to the transmission casing, means adjustably mounted on the second sleeve for shifting the driven side of the clutch with respect to the driving side thereof for producing engagement and disengagement of the clutch, and a one-way brake acting between the sleeves adjacent the transmission casing for preventing during engagement of the clutch rotation of the input shaft in a direction opposed to the said given direction.

13. The combination with a change-speed transmission comprising a casing, an input shaft projecting from the casing, an output shaft, and gearing connecting the shafts so as to provide different directions of rotation of the output shaft for a given direction of rotation of the input shaft, and a clutch comprising a hub member, a shell secured to the periphery of the hub member, a disc drivingly connected with the input shaft, a pressure ring, springs acting between the pressure ring and the shell to make the pressure ring press the disc into driving engagement with the hub member, levers mounted on the shell for disengaging the disc from the hub member; of a first sleeve surrounding a portion of the input shaft exterior of the transmission casing, a connector secured to the shell and projecting inwardly into driving engagement with the first sleeve, a second sleeve surrounding the first sleeve and attached to the transmission casing, an annulus positioned within the clutch so as to be engageable with the levers, a plurality of pins secured to the annulus in spaced relation about the input shaft and extending parallel thereto through the connector, control means mounted on the second sleeve so as to be engageable with the pins for causing the annulus to make the levers release the pressure ring from effecting engagement between the disc and the hub member, and a one-way brake acting between the sleeves adjacent the transmission casing for preventing rotation of the input shaft in a direction opposite to the said given direction during engagement of the clutch.

14. The combination with a change-speed transmission comprising a casing, an input shaft projecting from the casing, an output shaft, and gearing connecting the shafts so as to provide different directions of rotation of the output shaft for a given direction of rotation of the input shaft, and a clutch comprising a driven side drivingly connected to the input shaft, a driving side surrounding the driven side, and disabling means contained within the driving side for producing engagement and disengagement of the clutch by adjustment of the driving and driven sides with respect to one another; of a first sleeve surrounding a portion of the input shaft exterior of the transmission casing and drivingly connected with the driving side of the clutch, a second sleeve surrounding the first sleeve and attached to the transmission casing, control means mounted on the second sleeve, and elements passing through the driving side of the clutch for causing the control means to act upon the disabling means to engage or disengage the clutch, and a one-way brake acting between the sleeves to prevent rotation of the input shaft in a direction opposed to the said given direction during engagement of the clutch.

15. The combination with an engine, a transmission having an input shaft, an output shaft, and means connecting the input and output shafts in arrangements involving a plurality of speed ratios of output shaft to input shaft for a certain direction of rotation of the output shaft with a given direction of rotation of the input shaft and at least one other speed ratio of the output shaft to input shaft for rotation of the output shaft opposite to the said given direction of rotation of the input shaft, said connecting means including gears and an overrunning clutch enabling certain of the gears to be kept in mesh throughout operation in the said plurality of speed ratios, and a clutch having a driving side drivingly connected with the engine and a driven side drivingly connected with the input shaft of a one-way brake associated with the driving side of the last named clutch so as to prevent during engagement of the clutch rotation of the input shaft in a direction opposite to the said given direction produced by attempted rotation of the output shaft in the said certain direction during operation of the transmission in the said other speed ratio and also produced by attempted rotation of the output shaft in the direction opposite to the said certain direction during operation of the transmission in the said plurality of speed ratios, the portions of the connecting means between the input and output shafts associated with the overrunning clutch rotating in the proper direction to cause the same to transmit drive under the above conditions.

16. The combination with a shaft and driving means therefor comprising a fluid power-transmitting device and a clutch having a driving side connected with the fluid power-transmitting device and a driven side connected with the shaft; of a holding device for preventing rotation of the shaft in one direction during engagement of the clutch, said holding device comprising a one-way brake, and a sleeve surrounding the shaft and connecting the one-way brake and the driving side of the clutch.

17. The combination with a fluid power-transmitting device, a clutch comprising a driving side connected with the device and having a cover, and a driven side formed of a disk positioned within the driving side, and a shaft projecting through the fluid power-transmitting device and the clutch and having driving engagement with the disk thereof; of a holding device for preventing rotation of the shaft in one direction during engagement of the clutch, said holding device comprising a one-way brake, and a sleeve surrounding the shaft and connecting the one-way brake and the cover.

18. The combination with an engine, a change speed transmission comprising an input shaft, an output shaft, and gearing connecting the input and output shafts to provide for a first drive-transmitting arrangement involving rotation of the output shaft in one direction for a given direction of rotation of the input shaft and a second drive-transmitting arrangement involving rotation of the output shaft in the opposite direction for the said given direction of rotation of the input shaft, a clutch comprising a driving side and a driven side, said driven side being drivingly connected with the input shaft, a slip-drive power transmitting device drivingly connecting the engine and the driving side of the clutch, and a housing for said clutch and said slip-drive power transmitting device; of a first sleeve surrounding a portion of the input shaft, said sleeve being drivingly connected with the driving side of the clutch and spaced radially outwardly from said input shaft, a flange ring carried by said housing having portions surrounding said first sleeve, a one-way brake acting between said sleeve and the portions of said flange ring surrounding said sleeve adapted to prevent, during engagement of the clutch, rotation of the input shaft in a direction opposed to the said given direction, and means adjustably mounted within said first sleeve for shifting the driving side of the clutch with respect to the driven side thereof to effect engagement and disengagement of the clutch and thereby control operation of the one-way brake.

19. The combination with an engine, a change speed transmission comprising an input shaft, an output shaft, and gearing connecting the input and output shafts to provide for a first drive-transmitting arrangement involving rotation of the output shaft in one direction for a given direction of rotation of the input shaft and a second drive-transmitting arrangement involving rotation of the output shaft in the opposite direction for the said given direction of rotation of the input shaft, a clutch comprising a driving side and a driven side, said driven side being drivingly connected with the input shaft, a slip-drive power transmitting device drivingly connecting the engine and the driving side of the clutch, and a housing for said clutch and said slip-drive power transmitting device; of a first sleeve surrounding a portion of the input shaft, said sleeve being drivingly connected with the driving side of the clutch and spaced radially outwardly from said input shaft, a wall carried by said housing having portions surrounding portions of said first sleeve, a one-way brake acting between said sleeve and the portions of said housing wall surrounding said sleeve adapted to prevent, during engagement of the clutch, rotation of the input shaft in a direction opposed to the said given direction, and means adjustably mounted within said first sleeve for shifting the driving side of the clutch with respect to the driven side thereof to effect engagement and disengagement of the clutch.

20. In combination, an engine driven member, a transmission having input and output members arranged for rotation of the output member in the same direction as and in the opposite direction to the input member, a fluid operated power transmitting device comprising relatively rotatable driving and driven elements, said fluid power transmitting device being interposed between said engine driven member and said transmission input member, means drivingly connecting the engine driven member and the driving element of the fluid power transmitting device, drive transmitting means connecting the driven element of the fluid power transmitting device and the transmission input member, a relatively fixed member and a one-way brake connected between said relatively fixed member and the driven element of the fluid power transmitting device to restrain rotation of said transmission input member in one direction.

21. In combination, an engine-driven shaft and a gear type power transmission unit including relatively rotatable input and output members arranged to provide for rotation of the output member in the same direction as and in the opposite direction to the input member, said engine driven shaft and said input member being interconnected by drive transmitting means including a fluid operated slip-drive power transmitting device, a clutch having driving and driven members included in the drive transmitting means interconnecting the slip-drive power transmitting device and the input to the power transmission unit, a relatively fixed member and a one-way brake connected between said relatively fixed member and the driving member of said clutch, said brake being arranged to prevent rotation of the input member in one direction when the clutch is engaged.

22. In a motor vehicle drive train, an engine driven driving shaft, a slip-drive power transmitting device drivingly connected to and driven by said driving shaft, a clutch including frictionally engageable driving and driven elements having the driving element thereof drivingly connected to and driven by the slip-drive power transmitting device, a vehicle propelling driven shaft drivingly connected to the driven element of said clutch, and a one-way brake device arranged concentrically about a portion of said driven shaft and connected between the driving element of said clutch and a relatively fixed member to prevent rotation of said driven shaft in one direction.

23. In a motor vehicle drive train, an engine driven driving shaft, a fluid operated slip-drive power transmitting device drivingly connected to and driven by said driving shaft, a manually controlled clutch including frictionally engageable driving and driven elements having the driving element thereof drivingly connected to and driven by the fluid operated slip-drive power transmitting device, a vehicle propelling driven shaft drivingly connected to the driven element of said clutch, and a one-way brake device arranged concentrically about a portion of said driven shaft and connected between a relatively fixed member and the driving element of said clutch to prevent rotation of said driven shaft in one direction, the portion of the drive train from said driven shaft to said one-way brake device passing through the frictionally engaged clutch, whereby the effect of said one-way brake is operatively controlled by the engagement of said clutch.

24. In a motor vehicle drive train comprising an engine driven driving shaft, a slip-drive power transmitting device drivingly connected to the driving shaft, a manually controlled clutch device having frictionally engageable driving and driven elements, means drivingly connecting the slip drive power transmitting device and the clutch driving element, a vehicle propelling driven shaft arranged in series drive transmitting relationship with and connected to the clutch driven element, and a one-way brake arranged concentrically about said driven shaft and connected to the driving element of said clutch to prevent rotation of the driving element in one direction, the transmission of drive from said driven shaft to said one-way brake passing through the frictionally engaged clutch elements whereby the effect of said one-way brake on the drive train is operatively controlled by said clutch.

CARL A. NERACHER.
WILLIAM T. DUNN.

REFERENCES CITED

The following references are of record in the file of this patent:

UNITED STATES PATENTS

| Number | Name | Date |
| --- | --- | --- |
| 866,456 | George | Sept. 17, 1907 |
| 1,410,423 | Stevens | Mar. 21, 1922 |
| 1,694,181 | Kaplon | Dec. 4, 1928 |
| 2,182,407 | Phelan et al. | Dec. 5, 1939 |
| 2,245,817 | Peterson et al. | June 17, 1941 |
| 2,279,999 | McKechnie | Apr. 14, 1942 |
| 2,324,703 | Hoffman | July 20, 1943 |
| 2,349,642 | Watson | May 23, 1944 |
| 2,548,207 | Dunn | Apr. 10, 1951 |